US009933805B2

(12) United States Patent
Liu et al.

(10) Patent No.: US 9,933,805 B2
(45) Date of Patent: Apr. 3, 2018

(54) POWER CONVERTER USING WIDE BAND-GAP DEVICES

(71) Applicant: ABB Schweiz AG, Zurich (CH)

(72) Inventors: Liming Liu, Cary, NC (US); Jing Xu, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/194,058

(22) Filed: Jun. 27, 2016

(65) Prior Publication Data

US 2017/0371367 A1    Dec. 28, 2017

(51) Int. Cl.
*H02M 7/533*    (2006.01)
*G05F 3/08*    (2006.01)
(Continued)

(52) U.S. Cl.
CPC .............. *G05F 3/08* (2013.01); *H02M 7/533* (2013.01); *H02M 1/08* (2013.01); *H02M 3/06* (2013.01); *H02M 2007/4815* (2013.01)

(58) Field of Classification Search
CPC ............ H02M 7/48; H02M 7/44; H02M 7/42; H02M 7/483; H02M 7/487; H02M 7/49;
(Continued)

(56) References Cited

U.S. PATENT DOCUMENTS

2008/0266919 A1    10/2008  Mallwitz
2009/0225578 A1*   9/2009   Kitabatake .......... H01L 29/0696
                                                        363/132
(Continued)

OTHER PUBLICATIONS

Q. Li, "A Review of the Single Phase Photovoltaic Module integrated Converter Topologies with Three Different DC Link Configurations," IEEE Transactions on Power Electronics, vol. 23, No. 3, pp. 1320-1333, May 2008.
(Continued)

*Primary Examiner* — Timothy J Dole
*Assistant Examiner* — Bryan R Perez
(74) *Attorney, Agent, or Firm* — Taft Stettinius & Hollister LLP

(57) ABSTRACT

Unique systems, methods, techniques and apparatuses of a power converter are disclosed. One exemplary embodiment is an electrical power conversion system comprising a first converter stage, a second converter stage, a third converter stage, and a control system. The first converter stage is operable to boost DC power received from a DC power source. The second converter stage is operable to boost DC power received from the first converter stage. The third converter stage includes an inverter. The control system is structured to receive as input voltage ($V_{pv}$) and current ($I_{pv}$) output by the DC power source, voltage ($V_{dc}$) output by the second controller stage, and voltage ($V_{ac}$) and a current ($I_{ac}$) which are output by the third stage to an AC electrical power system, provide a control command for the first converter stage, and process the information of $V_{dc}$, $V_{ac}$ and $I_{ac}$ to provide control commands for the inverter switches.

21 Claims, 4 Drawing Sheets

(51) Int. Cl.
*H02M 1/08* (2006.01)
*H02M 3/06* (2006.01)
*H02M 7/48* (2007.01)

(58) Field of Classification Search
CPC ...... H02M 7/501; H02M 7/493; H02M 7/515; H02M 7/521; H02M 2007/4803; H02M 2007/4815; Y02B 70/1416
See application file for complete search history.

(56) References Cited

U.S. PATENT DOCUMENTS

| | | | | |
|---|---|---|---|---|
| 2011/0188271 | A1* | 8/2011 | Shinotsuka | H02M 3/335 363/21.15 |
| 2012/0104988 | A1* | 5/2012 | Ramu | H02K 1/24 318/722 |
| 2013/0033910 | A1* | 2/2013 | Carletti | H02M 1/42 363/131 |
| 2013/0163302 | A1* | 6/2013 | Li | H02M 3/158 363/127 |

OTHER PUBLICATIONS

E. Achille et al., "Optimized DC-AC Boost Converters for Modular Photovoltaic Grid-Connected Generators," IEEE International Symposium on Industrial Electronics. pp. 1005-1010, 2004, France.

L. Garcia-Rodriguez et al., "Dual-Stage Microinverter Design With a GaN-Based Interleaved Flyback Converter Stage," Energy Conversion Congress and Exposition (ECCE), IEEE, pp. 4496-4502, 2013.

D. Cao et al., "Low Cost Transformer Isolated Boost Half-bridge Micro-inverter for Single-phase Grid-connected Photovoltaic System," 27th annual IEEE Applied Power Electronics Conference and Exposition (APEC), pp. 71-78, 2012.

S. Kjaer, "Design and Control of an Inverter for Photovoltaic Applications," Dissertation submitted to Aalborg University, 237 pgs., 2005, Denmark.

T. Shimizu et al., "A Flyback-type Single Phase Utility Interactive Inverter with Low-frequency Ripple Current Reduction on the DC Input for an AC Photovoltaic Module System," IEEE 33rd annual Power Electronics Specialists Conference (PESC), pp. 1483-1488, 2002, Tokyo, Japan.

S. Kjaer et al., "Design Optimization of a Single Phase Inverter for Photovoltaic Applications," 34th annual Power Electronics Specialist Conference (PESC), pp. 1183-1190, 2003, Denmark.

S. Harb et al., "Three-Port Photovoltaic Micro-Inverter with Power Decoupling Capability," 26th annual IEEE Applied Power Electronics Conference and Exposition (APEC), pp. 203-208, 2011, Orlando, Florida.

Z. Zhao et al., "High Efficiency Single-stage Grid-tied PV Inverter for Renewable Energy System," Dissertation, submitted to Virginia Polytechnic Institute and State University, 159 pgs. Apr. 20, 2012, Blacksburg, Virginia.

R. O. Caceres et al., "A Boost DC-AC Converter: Analysis, Design, and Experimentation," IEEE Transactions on Power Electronics, vol. 14, No. 1, pp. 134-141, Jan. 1999.

N. Vazquez et al., "Analysis and Experimental Study of the Buck, Boost and Buck-Boost Inverters," IEEE Power Electronics Specialist Conference (PESC), pp. 801-806, 1999, Mexico.

F. Kang et al., "Interface Circuit for Photovoltaic System Based on Buck-Boost Current-Source PWM Inverter," Proc. Annu. Conf. Ind. Electron. Soc., 2002, pp. 3257-3261.

S. Saha et al., "Novel Grid-Connecteded Photovoltaic Inverter," IEE Proc. Generat., Transmiss. Distrib., vol. 143, No. 2, pp. 219-224, Mar. 1996.

O. Abdel-Rahim, "High Gain Single-Stage Inverter for Photovoltaic AC Modules," in Proc. Annu. IEEE Appl. Power Electron. Conf. Expo., 2011, pp. 1961-1967, Aswan City, Egypt.

Z. Zhao et al., "Derivation of Boost-Buck Converter Based High-Efficiency Robust PV Inverter," in Proc. IEEE Energy Convers. Congr. Expo., 2010, pp. 1479-1484, Blacksburg, Virginia.

G. Henn et al., "Interleaved-Boost Converter With High Voltage Gain," IEEE Transactions on Power Electronics, vol. 25, No. 11, pp. 2753-2761, Nov. 2010.

W. Chen et al., "Analysis and Comparison of Medium Voltage High Power DC/DC Converters for Offshore Wind Energy Systems," IEEE Transactions on Power Electronics, vol. 28, No. 4, pp. 2014-2023, Apr. 2013.

A. Lopez et al., "Analysis and Comparison of Three Topologies of the Ladder Multilevel DC/DC Converter," IEEE Transactions on Power Electronics, vol. 22, No. 7, pp. 3119-3127, Jul. 2012.

Y. Zhou et al., "Analysis and Suppression of Leakage Current in Cascaded-Multilevel-Inverter-Based PV Systems," IEEE Transactions on Power Electronics, vol. 29, No. 10, pp. 5265-5277, Oct. 2014.

C. Wang, "A Novel Single-Stage Full-Bridge Buck-Boost Inverter," IEEE Transactions on Power Electronics, vol. 19, No. 1, pp. 150-159, Jan. 2004.

* cited by examiner

POWER CONVERTER USING WIDE BAND-GAP DEVICES

BACKGROUND

The present disclosure relates generally to power converters. Photovoltaic panels and other direct current (DC) power generation devices can produce power at voltage levels below the voltage levels of power distribution networks such as a utility grid. Some power converters, such as string inverters and micro-inverters, receive the DC power produced at a low voltage level and convert the power to alternating current (AC) power with a high voltage sufficient for power distribution networks. Existing power converters for voltage boost applications suffer from a number of shortcomings and disadvantages. There remain significant unmet needs including reduced passive component sizes, reduced switching losses, and increased power density, among others. For instance, some power converters require large passive components due to switching frequency constraints. There is a significant need for the unique apparatuses, methods, systems and techniques disclosed herein.

SUMMARY

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Exemplary embodiments include unique systems, methods, techniques and apparatuses for power converters. Further embodiments, forms, objects, features, advantages, aspects and benefits of the disclosure shall become apparent from the following description and drawings.

DETAILED DESCRIPTION OF ILLUSTRATIVE EMBODIMENTS

Figure 1:
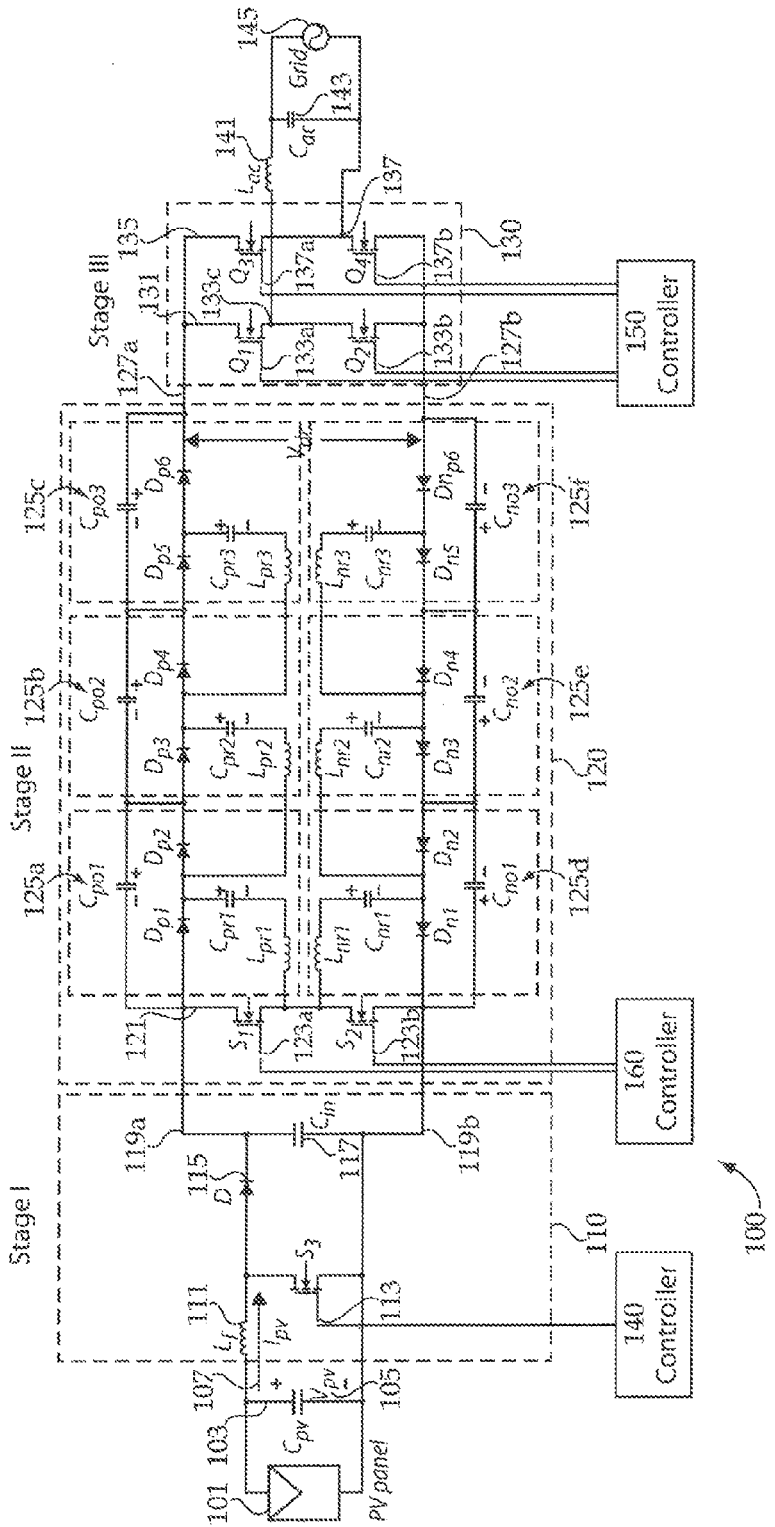
FIG. 1 illustrates an exemplary power converter.

With reference to FIG. 1 there is illustrated a power converter 100. In certain exemplary embodiments, converter 100 is a micro-inverter or a string inverter, although other similar types of converters are also contemplated. Converter 100 includes a first stage DC/DC converter 110, a second stage DC/DC converter 120, and an inverter 130. DC/DC converter 110 is coupled to a DC power source 101 and a capacitor 103. DC power source 101 is structured to generate DC power having a voltage 105 and a current 107. In the illustrated embodiment, DC power source 101 is a solar power based power source such as a solar panel or a solar panel array with an output current 107 and output voltage 105 within a wide voltage range, such as 30V-60V. Voltage 105 and current 107 fluctuate while DC power is being generated due to certain factors such as changes in solar irradiance and ambient temperature, to name a few examples. In certain embodiments, DC power source 101 is a plurality of solar panels, a battery bank, a fuel cell, or another type of DC power source. In certain embodiments, capacitor 103 may not be coupled to DC/DC converter 110.

DC/DC, converter 110 is structured to receive DC power from DC power source 101 and convert the received DC power by boosting the voltage of the received DC power to an average voltage greater than the average voltage of the DC power received from DC power source 101. In certain embodiments, the output voltage of converter 110 may fluctuate by at least 25%. For example, converter 110 may receive DC power from DC power source 101 with a voltage of 30, convert the received DC power to DC power with an average voltage of 60V and a voltage range between 45V and 75V. In the illustrated embodiment, DC/DC converter 110 includes an inductor 111, a switch 113, a diode 115, and a capacitor 117. In the illustrated embodiment, switch 113 is controlled by controller 140, as described in more detail below. In certain embodiments, switch 113 is a semiconductor device such as a metal-oxide-semiconductor field-effect transistor (MOSFET), an insulated-gate bipolar transistor (IGBT) or other types of power switching devices. It shall be appreciated that any or all of the foregoing features of switch 113 may also be present in the other switches disclosed herein. In other embodiments, DC/DC converter 110 includes fewer components or additional components as long as converter 110 is controlled by controller 140, structured to receive DC power with a voltage 105 and current 107 from power source 101, and structured to boost voltage of the received DC power to an average voltage greater than the average voltage of the received DC power.

DC/DC converter 110 is structured to output DC power with a boosted voltage to a DC bus including a positive rail 119a and a negative rail 119b. In certain embodiments, negative rail 119b is at a non-negative reference voltage, such as a zero voltage, a neutral voltage, or a positive voltage lower than that of positive rail 119a. DC/DC converter 120 is a switched capacitors based resonant converter structured to receive the DC power from DC/DC converter 110 by way of the DC bus rails 119a and 119b, and convert the received DC power to DC power with a different voltage. Unlike some converters, DC/DC converter 120 is structured to boost the voltage of the received DC power without the use of a transformer, eliminating the need for a large passive component. DC/DC converter 120 includes a leg 121 coupled between DC rails 119a and 119b. Leg 121 includes a pair of switches 123a and 123b. Each of switches 123a and 123b is operated with an approximate 50% duty cycle by a controller 160 such that when one switch is activated, the other switch is deactivated. Both switches 123a and 123b are structured to be operated with high switching frequency. Switches 123a and 123b are wide band-gap semiconductor devices, such as gallium nitride devices. In certain embodiments, the switching frequency of switches 123a and 123b is at least 10 kHz. In certain embodiments, the switching frequency of switches 123a and 123b is at least 100 kHz. It shall be appreciated that any or all of the foregoing features of switches 123a and 123b may also be present in the other switches disclosed herein.

In the illustrated embodiment, DC/DC converter 120 includes a plurality of power cells 125a-125f. Three power cells are coupled in series with DC rail 119a and three power cells are coupled in series with DC rail 119b, the symmetrical structure reducing current and voltage ripple, as well as reducing stress on switches 123a and 123b. As discussed in further detail below, power cells 125a-125f are structured to receive DC power from DC bus rails 119a and 119b; increase or decrease the voltage of the DC power at a fixed ratio based on the number of power cells 125a-125f in converter 120; and output the converted DC power including a voltage $V_{dc}$ to a second DC bus having rails 127a and 127b. Power cells 125a-125f are structured such that switches 123a and 123b are activated and deactivated during a substantially zero current condition. In certain embodiments, a substantially zero current condition is a current less than or equal to 10% of the peak of the current received with DC/DC converter 120. Power cells 125a-125 are structured such that the resonant frequency is one to two times the switching frequency of switches 123a and 123b.

DC bus rails 127a and 127b are coupled between DC/DC converter 120 and inverter 130. The voltage difference between DC bus rails 127a and 127b is bus voltage $V_{dc}$. In certain embodiments, voltage $V_{dc}$ fluctuates as a result of the operation of DC/DC converter 120. Inverter 130 is also coupled to an AC load 145 by way of a filter including an inductor 141 and a capacitor 143. In the illustrated embodiment, AC load 145 is a utility grid with a voltage of 240V.

Inverter 130 is structured to receive DC power from DC/DC converter 120 having a voltage $V_{dc}$; convert the received DC power to AC power; and output AC power to the AC load 145. Inverter 130 includes a first leg 131 having a first switch 133a, a second switch 133b, and an output node 133c. Inverter 130 includes a second leg 135 having a first switch 137a, a second switch 137b, and an output node 137c.

Converter 100 includes a controller 150 coupled to inverter 130 and structured to operate switches 133a, 133b, 137a, and 137b of inverter 130 by selectively transmitting activation signals to each switch. In certain embodiments, controller 150 and controller 160 are one controller performing the separate functions associated with controller 150 and controller 160. Converter 100 is structured to reduce double line frequency power ripple by decoupling controller 140 and controller 150. Since controller 140 and controller 150 are decoupled, voltage variation on DC bus rails 119a, 119b, 127a, and 127c is permitted, allowing the size of the passive components of converter 120 to be reduced. In certain embodiments, the voltage on the DC bus rails may vary by more than 25%.

Figure 2:
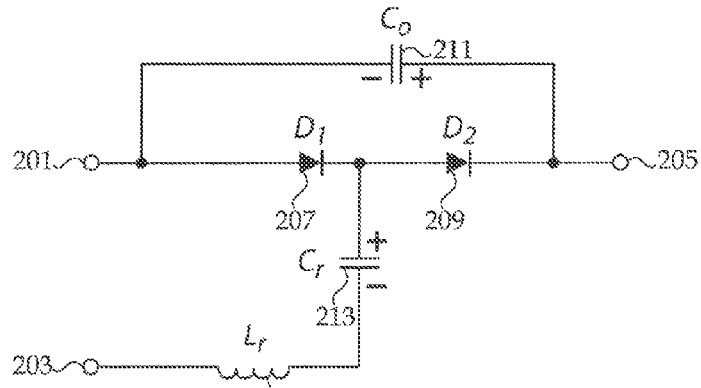
FIG. 2 illustrates a power cell of the exemplary power converter in FIG. 1.

With reference to FIG. 2 there is illustrated power cell 125a of converter 120 in FIG. 1. Power cell 125a includes a first input node 201, a first diode 207 coupled in series to input node 201, a second diode 209 coupled in series to diode 207, and an energy storage device 211 coupled in parallel to diode 207 and diode 209. Power cell 125a also includes an output node 205 coupled to energy storage device 211 and diode 209. Diodes 207 and 209 are structured so as to prevent current from flowing from output node 205 to input node 201 by way of diodes 207 and 209. In the illustrated embodiment, device 211 is a capacitor. Energy storage device 211 may be a film capacitor or an electrolytic capacitor. In other embodiments, energy storage device 211 is another type of energy storage device, such as a super-capacitor, a battery, or a battery bank. Power cell 125a further includes a second input node 203 and a resonant circuit having a capacitor 213 and an inductor 215 coupled in series, input node 203 being coupled to diode 207 and 209 by way of inductor 215 and capacitor 213. It is important to note the required passive component sizes for capacitor 213 and inductor 215 of the resonant circuit are significantly reduced due to the high switching frequency of switches 123a and 123b compared to other semiconductor switches such as IGBTs. In other embodiments, power cell 125a includes additional or fewer components. It shall be appreciated that any or all of the foregoing features of power cell 125a are present in the other power cells 125b-125f disclosed herein.

As illustrated in FIG. 1, DC/DC converter 120 includes a plurality of power cells 125a-125f. Three power cells 125a-125c are coupled between DC bus rail 119a and DC bus rail 127a. For power cell 125a, input node 201 is coupled to DC bus rail 119a, input node 203 is coupled between switches 123a and 123b, and output node 205 is coupled to input node 201 of the power cell 125b. For power cell 125b, input node 201 is coupled to output node 205 of power cell 125a and input node 203 is coupled to diodes 207 and 209 of power cell 125a. For power cell 125c, input node 201 is coupled to output node 205 of power cell 125b and input node 203 is coupled to diodes 207 and 209 of power cell 125b. Output node 205 of power cell 125c is coupled to DC bus 127a.

Three power cells 125d-125f are coupled between DC bus rail 127a and DC bus rail 127b. For power cell 125d, input node 201 is coupled to DC bus rail 119b, input node 203 is coupled between switches 123a and 123b, and output node 205 is coupled to input node 201 of the power cell 125e. For power cell 125e, input node 201 is coupled to output node 205 of power cell 125d and input node 203 is coupled to diodes 207 and 209 of power cell 125d. For power cell 125f, input node 201 is coupled to output node 205 of power cell 125e and input node 203 is coupled to diodes 207 and 209 of power cell 125e. Output node 205 of power cell 125f is coupled to DC bus 127a.

The number of power cells 125a-125f determine the voltage boost capabilities of DC/DC converter 120. For example, when converter 120 receives DC power from converter 110 with an average voltage of 60V, the six power cell 125a-125f arrangement of converter 120 boosts the voltage $V_{dc}$ to 420 V.

When the energy storage devices 211 of the power cells 125a-125f are batteries or supercapacitors, converter 100 may be structured to provide AC power to AC load 145 when DC power source 101 is not providing power to converter 110. For example, DC power source 101 may not transfer power to converter 110 on a cloudy day or during a storm. By storing energy in the energy storages devices 211 of converter 120, converter 100 may provide power to AC load 145 during a temporary loss of power from DC power source 101.

Figure 3:
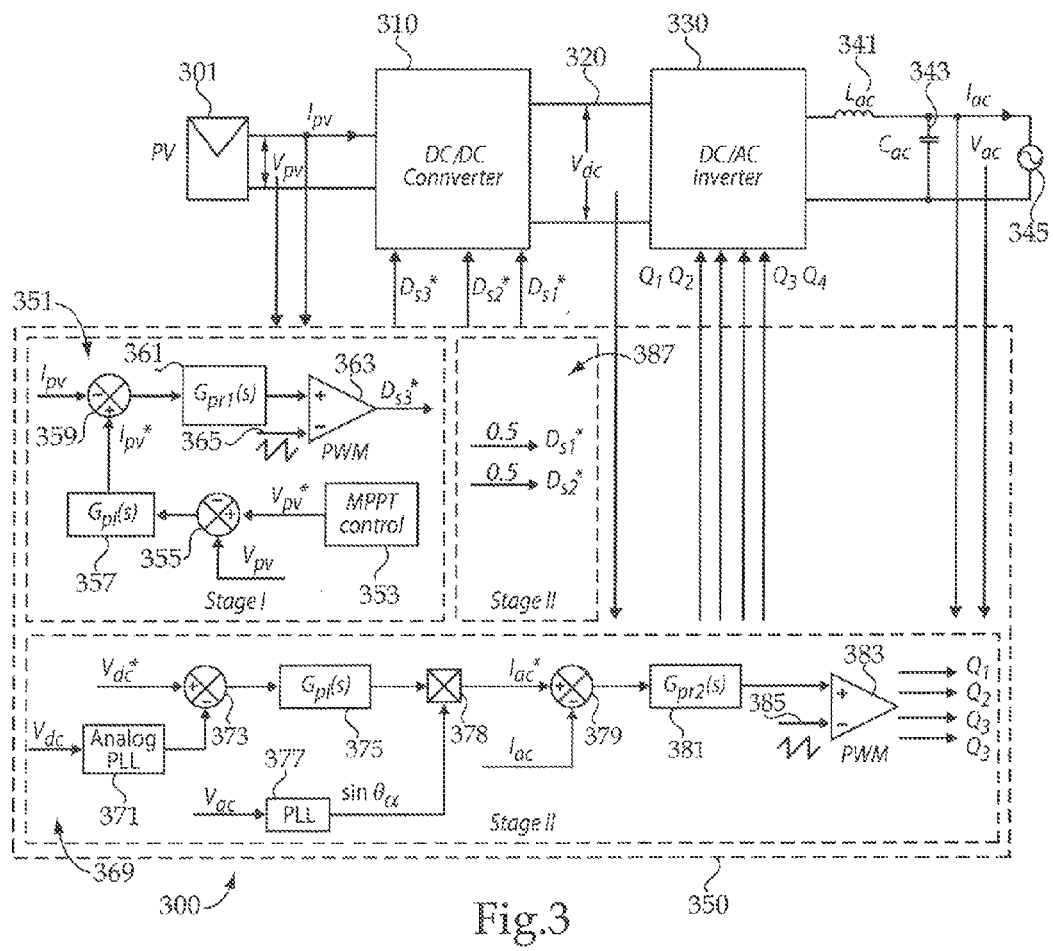
FIG. 3 illustrates an exemplary power converter control system.

With reference to FIG. 3 there is illustrated an exemplary power converter 300 coupled to a DC power source 300 having an output voltage $V_{pv}$ and an output current $I_{pv}$. Converter 300 includes a DC/DC converter 310 coupled to DC power source 301 and structured to receive DC power at a voltage $V_{pv}$ and a current $I_{pv}$; convert the received DC power to DC power having a voltage $V_{dc}$; and output the converted DC power. Converter 310 includes two stages, just as converter 100 of FIG. 1 includes converters 110 and 120.

Converter 300 includes a plurality of controllers 350 including a first controller 351 structured to operate the first stage of converter 310, receive measurements of $V_{pv}$ and $I_{pv}$, and output an activation signal $D_{s3}*$ to a controllable device of converter 310. Each measurement received by controllers 350 is collected by a sensor and provided to the appropriate controller. Controller 351 includes an MDPT controller structured to generate a DC power source voltage reference value $V_{pv}*$ for $V_{pv}$; a subtraction module 355 structured to receive $V_{pv}*$ and $V_{pv}$, subtract $V_{pv}$ from $V_{pv}*$, and output the calculated value; and a PI controller 357 structured to receive the calculated value from module 355 and generate a reference value $I_{pv}*$. A subtraction module 359 is structured to receive and subtract $I_{pv}$ from $I_{pv}*$, and output the calculated value. Controller 351 also includes a PR controller 361 is structured to receive the calculated value from subtraction module 359, generate a carrier signal using the calculated value, and output the carrier signal to a comparator 363. The comparator is structured to receive the carrier signal and a sawtooth signal 365, compare the two values, and output an activation signal $D_{s3}*$ using the comparison of the carrier signal and the sawtooth signal. In certain embodiments, the sawtooth signal 365 may be replaced by a triangular wave or any type of signal with a repeating pattern.

The plurality of controllers 350 include a second controller 387 structured to provided activation signals $D_{s1}*$ and $D_{s2}*$ to converter 310. $D_{s1}*$ and $D_{s2}*$ are alternating signals with a 50% duty cycle.

Converter 300 includes an inverter 330 coupled to DC/DC converter 310 by way of a DC bus 320. Inverter 330 is structured to receive DC power at a voltage $V_{dc}$ from converter 310 by way of DC bus 320; convert the DC power to AC power; and output the AC power having a voltage $V_{ac}$ and a current $I_{ac}$ to an AC load 345 by way of a filter having an inductor 341 and a capacitor 343.

The plurality of controllers 350 include an inverter controller 369 structured to receive measurements of $V_{dc}$, $V_{ac}$, $I_{ac}$ and output a plurality of activation signals Q1-Q4. Inverter 330 is structured to receive activation signals Q1-Q4 and control the operation of at least four switching devices using activation signals Q1-Q4. Controller 369 includes an analog low pass filter 371, a PI controller 375, a phase locked loop controller 377, a PR controller 381, and a comparator 383. Controller 369 includes an analog low pass filter 371 structured to receive the $V_{dc}$ measurement, filter the $V_{dc}$ measurement with a low pass filter, and output a filtered $V_{dc}$ measurement. Controller 369 also includes a subtraction module 373 structured to receive the filtered $V_{dc}$ measurement and a $V_{dc}*$ reference value, subtract the filtered $V_{dc}$ measurement from the reference value $V_{dc}*$, and output the calculated value. $V_{dc}*$ reference value may be obtained using the number of power cells and the output voltage of converter 110 to estimate the output voltage of converter 310, as illustrated by the following equation, where N is the number of power cells and $V_{cin}$ is the output voltage of the first stage of converter 310:

$$V*_{dc} = (N+1) \times V_{cin} \quad (1)$$

PI controller 375 is structured to receive the calculated value from subtraction module 373 and output a reference value of DC bus 320 current. Phase locked loop controller 377 is structured to receive the AC power voltage measurement $V_{ac}$, determine the phase of the $V_{ac}$, and output the phase angle of $V_{ac}$. Device 378 is structured to receive the calculated current reference value and calculated $V_{ac}$ phase angle, and calculate an AC current reference value $I_{ac}*$ using the calculated current reference value and calculated $V_{ac}$ phase angle. A subtraction module 379 receives the reference AC current value $I_{ac}*$ and the AC current value $I_{ac}$, subtracts $I_{ac}$ from $I_{ac}*$, and outputs the calculated value. PR controller 381 receives the calculated value from module 379 and generates a carrier signal using the calculated value. Comparator 383 receives the carrier signal from PR controller 381 and a sawtooth wave 385, and uses the carrier signal and wave 385 to generate activation signals Q1-Q4. In certain embodiments, the sawtooth signal 385 may be replaced by a triangular wave or any type of signal with a repeating pattern.

Figure 4:
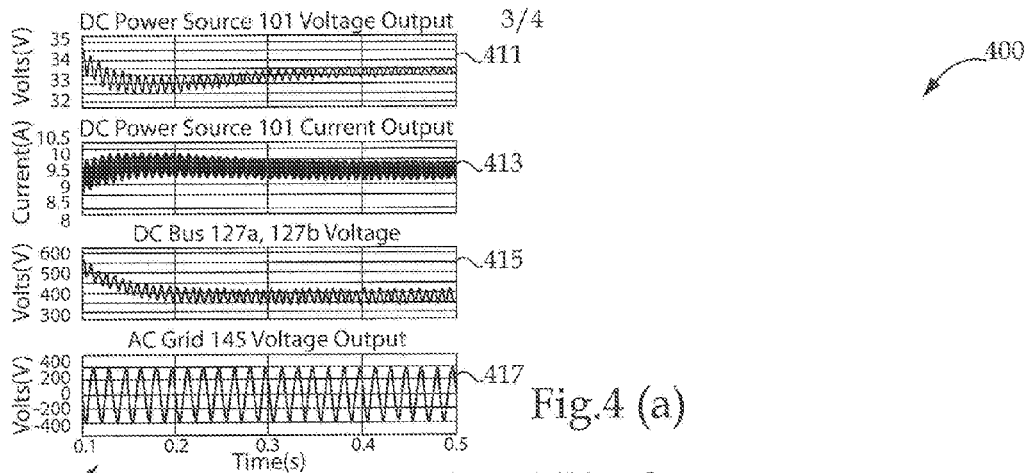
FIGS. 4(a)-4(c) are a plurality of graphs illustrating performance of an exemplary power converter.
Figure 4:
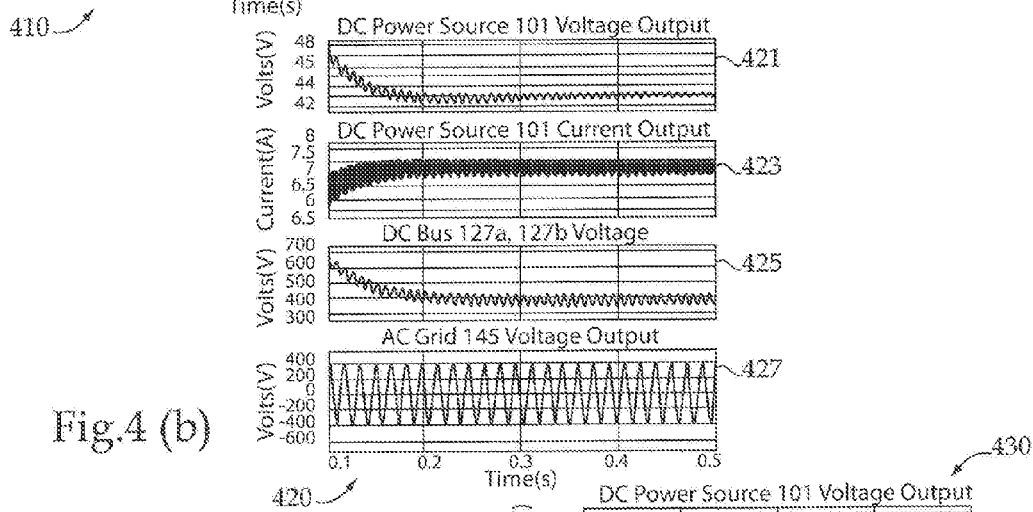
Figure 4:
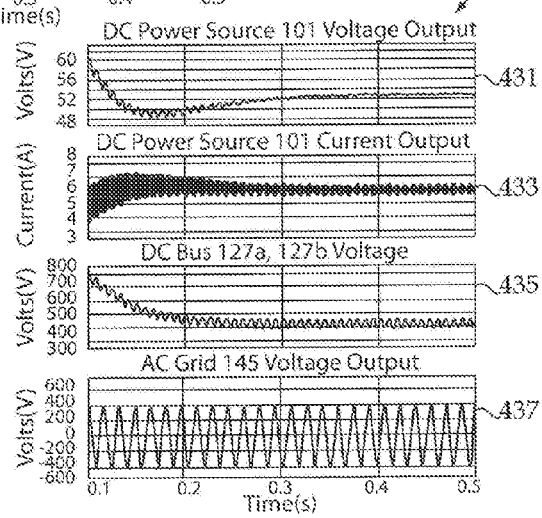

With reference to FIG. 4(a) there is illustrated a plurality of graphs 410 including graphs 411, 413, 415, and 417 depicting the performance of an exemplary power converter, such as converter 100 of FIG. 1, where the power converter begins to receive DC power with a voltage 105 of 32.8 V from DC power source 101.

The plurality of graphs 410 depict converter performance over a period of time between 0.1 and 0.5 seconds. Graph 411 illustrates the voltage output of DC power source 101, graph 413 illustrates the current output of DC power source 101, graph 415 illustrates DC bus voltage $V_{dc}$, and graph 417 illustrates AC output voltage to AC load 145.

With reference to FIG. 4(b) there is illustrated a plurality of graphs 420 including graphs 421, 423, 425, and 427 depicting the performance of an exemplary power converter, such as converter 100 of FIG. 1, where the power converter begins to receive DC power with a voltage 105 of 42.2 V from DC power source 101. The plurality of graphs 420 depict converter 100 performance over a period of time between 0.1 and 0.5 seconds. Graph 421 illustrates the voltage output of DC power source 101, graph 423 illustrates the current output of DC power source 101, graph 425 illustrates DC bus voltage $V_{dc}$, and graph 427 illustrates AC output voltage to AC load 145.

With reference to FIG. 4(c) there is illustrated a plurality of graphs 430 including graphs 431, 433, 435, and 437 depicting the performance of an exemplary power converter, such as converter 100 of FIG. 1, where the power converter begins to receive DC power with a voltage 105 of 52 V from DC power source 101. The plurality of graphs 430 illustrates converter 100 performance over a period of time between 0.1 and 0.5 seconds. Graph 431 illustrates the voltage output of DC power source 101, graph 433 illustrates the current output of DC power source 101, graph 435 illustrates DC bus voltage $V_{dc}$, and graph 437 illustrates AC output voltage to AC load 145.

Figure 5:
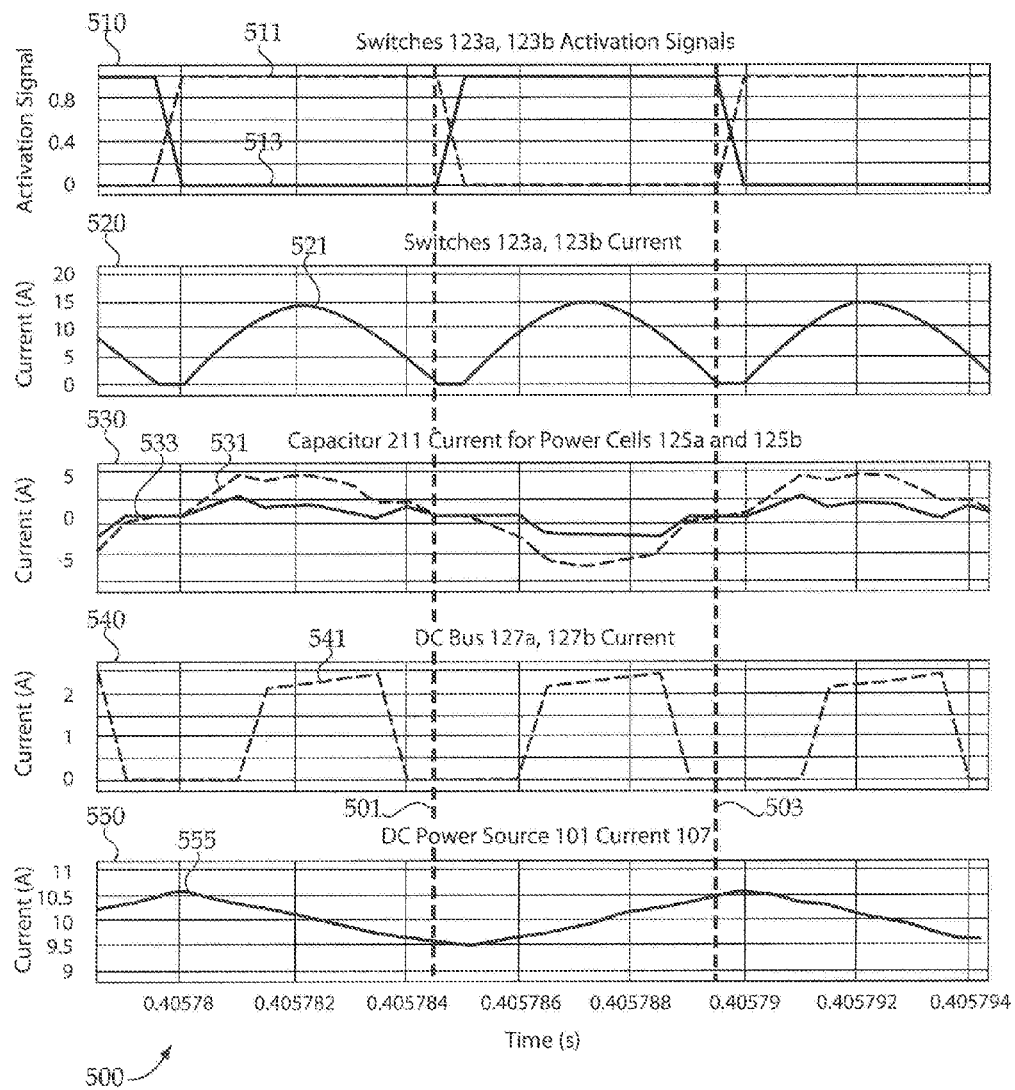
FIG. 5 is a plurality of graphs illustrating the performance of the power converter of FIG. 1 during switching operations.

With reference to FIG. 5 there is a plurality of graphs 500 including graphs 510, 520, 530, 540, and 550 illustrating the performance of converter 100 of FIG. 1 which includes the plurality of power cells 125 of FIG. 2. The plurality of graphs 500 illustrate converter performance with respect to time. Graph 510 illustrates activation signals 511 and 513 used to operate switches 123a and 123b, respectively, of DC/DC converter 120. Graph 520 illustrates the value of current 521 flowing through switches 123a and 123b. As seen in graphs 510 and 520 at times 501 and 503, converter 120 is structured such that switches 123a and 123b are opened and closed when no current is flowing through leg 121. Graph 530 illustrates the value of a current 531 flowing through energy storage device 211 of power cell 125a and the magnitude of a current 533 flowing through energy storage device 211 of power cell 125b. Graph 540 illustrates the magnitude of current flowing through DC bus rails 127a and 127b. Graph 540 illustrates the magnitude of current 107.

Further written description of a number of exemplary embodiments shall now be provided. One embodiment is a power converter comprising: a first DC/DC converter structured to receive DC power at a varying voltage and convert the received DC power to DC power with a first voltage; a second DC/DC converter structured to receive the converted DC power at the second voltage from the first DC/DC converter and boost the voltage of the received DC power to a third voltage, the second DC/DC converter including: a first DC bus having a first rail and a second rail, at least one pair of switching devices structured to operate at a frequency greater than 10 kHz and coupled across the first DC bus, and at least one power cell including: a first input node, a second input node, and an output node coupled to the first input node by way of at least two diodes coupled in series, coupled to the first input node by way of an energy storage device coupled in parallel with two of the diodes, and coupled to the second input node by way of one of the two diodes and a resonant circuit; an inverter structured to receive DC power at the third voltage from the second DC converter and convert the received DC power to AC power output; and a control system structured to operate the first DC/DC converter using a first control input and to operate the inverter using a second control input, the first control input and the second control input comprising distinct input values.

In certain forms of the foregoing power converter, the control system comprises an inverter controller structured to measure the third voltage, the AC output voltage, and the AC output current; and operate the inverter using a pulse width modulation signal calculated using the measured third voltage, the AC output voltage, and the AC output current. In certain forms, power converter comprises a DC/DC controller structured to operate the first DC/DC converter so as to convert the received DC power at the first voltage to DC power at the second voltage by magnifying the amplitude of the first voltage so as to produce a substantially fixed second voltage greater in magnitude compared to the first voltage. In certain forms, the DC/DC controller is structured to measure the first voltage, measure the current of the DC power received by the first DC/DC converter, and operate the first DC/DC converter by transmitting a pulse width modulation signal calculated using the first voltage measurement and current measurements. In certain forms, the switching devices are wide band-gap semiconductor devices structured to operate at a switching frequency greater than 20 kHz. In certain forms, the energy storage device is a battery bank. In certain forms, the first input node of a first power cell is coupled to the first rail of the DC bus and the second input node of the same power cell is coupled to each of the pair of switching devices. In certain forms, the second DC/DC converter comprises a second power cell, and wherein the first input node of the second power cell is coupled to the energy storage device and one of the two diodes of the first power cell, and the second input node of the second power cell is coupled to each of the two diode of the first power cell. In certain forms, the resonant circuit of the second DC/DC converter is structured such that the pair of switching devices of the second DC/DC converter are activated or deactivated in substantially zero current conditions.

Another exemplary embodiment is an electrical power conversion system comprising: a first converter stage electrically coupled with a PV source, the first stage including a first switching device and being operable to boost DC power received from the PV source; a second converter stage electrically coupled with the first stage, the second converter stage including second and third switching devices operably coupled with a resonant circuit network and being operable to boost DC power received from the first converter stage; a third converter stage electrically coupled with the second converter stage and electrically coupled with an AC electrical power system, the third stage including an inverter bridge including a plurality of inverter switching devices; and an electronic control system structured to receive as input information of a voltage ($V_{pv}$) and a current ($I_{pv}$) that are output by the PV source to the first converter stage, information of a voltage ($V_{dc}$) output by the second controller stage to the third controller stage, and information of a voltage ($V_{ac}$) and a current ($I_{ac}$) which are output by the third stage to the AC electrical power system, process the information of $V_{pv}$ and $I_{pv}$ to provide a control command for the first switching device, process the information of $V_{dc}$, $V_{ac}$ and $I_{ac}$ to provide control commands for the plurality of inverter switches, and provide control commands for the second and third switching devices utilizing a predetermined duty cycle.

In certain forms of the foregoing system, the resonant circuit network includes at least one power cell comprising a first input node, a second input node, and an output node coupled to the first input node by way of at least two diodes coupled in series, coupled to the first input node by way of an energy storage device coupled in parallel with two of the diodes, and coupled to the second input node by way of one of the two diodes and a resonant circuit. In certain forms, the resonant circuit network includes a plurality of said at least one power cell operatively coupled to one another. In certain forms, the electronic control system is structured to process the information of $V_{pv}$ and $I_{pv}$ using a flyback DC/DC converter controller to provide a control command for the first switching device. In certain forms, the electronic control system is structured to provide a control command for the first switching device by: receiving a first control reference from a maximum power point tracking controller, determining a first difference between $V_{pv}$ and the first control reference, providing the first difference to a transfer function operator to provide a second control reference, determining a second difference between $I_{pv}$ and the second control reference, providing the second difference as a modulating signal to a comparator, and providing a carrier input to the comparator effective to output a command for the first switching device. In certain forms, the electronic control system is structured to process the information of $V_{dc}$, $V_{ac}$ and $I_{ac}$ to provide control commands for the plurality of inverter switching devices by: receiving a first control reference, low pass filtering $V_{dc}$, determining a first difference between the low pass filtered $V_{dc}$ and the first control reference, providing the first difference to a transfer function operator, providing $V_{ac}$ to a phase locked loop, providing the output of the transfer function operator and the phase locked loop to an operator to provide a second control reference, determining a second difference between the second control reference and $I_{ac}$, providing the second difference to a second transfer function operator, providing the output of the second transfer function operator as a modulating signal to a comparator, and providing a carrier input to the comparator effective to output a command for the plurality of inverter switching device. In certain forms, the second converter is structured such that second and third switching devices are activated or deactivated under substantially zero current crossing conditions.

A further exemplary embodiment is a method for converting power from a DC power source, comprising: operating, with an electronic control system, a first converter stage including a first switching device, a second converter including second and third switching devices, and a third converter stage including an inverter bridge including a plurality of inverter switching devices; receiving, with the electronic control system, input information of a voltage ($V_{pv}$) and a current ($I_{pv}$) that are output by the DC source to the first converter stage, information of a voltage ($V_{dc}$) output by the second controller stage to the third controller stage, and information of a voltage ($V_{ac}$) and a current ($I_{ac}$) which are output by the third stage to the AC electrical power system; processing, with the electronic control system, the information of $V_{pv}$ and $I_{pv}$ to provide a control command for the first switching device; processing, with the electronic control system, the information of $V_{dc}$, $V_{ac}$ and $I_{ac}$ to provide control commands for the plurality of inverter switches; and providing, with the electronic control system, control commands for the second and third switching devices utilizing a predetermined duty cycle. In certain forms of the foregoing method, the control commands provided to the second and third switching devices are structured to operate the second and third switching devices under substantially zero current switching conditions. In certain forms, substantially zero current switching conditions includes a range between 0% and 10% of the peak magnitude of the current received by the second converter stage. In certain forms, processing, with the electronic control system, the information of $V_{pv}$ and $I_{pv}$ to provide a control command for the first switching device comprises: receiving a first control reference from a maximum power point tracking controller, determining a first difference between $V_{pv}$ and the first control reference, providing the first difference to a transfer function operator to provide a second control reference, determining a second difference between $I_{pv}$ and the second control reference, providing the second difference as a modulating signal to a comparator, and providing a carrier input to the comparator effective to output a command for the first switching device. In certain forms, processing, with the electronic control system, the information of $V_{dc}$, $V_{ac}$, and $I_{ac}$ to provide control commands for the plurality of inverter switches comprises: receiving a first control reference, filtering $V_{dc}$, determining a first difference between the low pass filtered $V_{dc}$ and the first control reference, providing the first difference to a transfer function operator, providing $V_{ac}$ to a phase locked loop, providing the output of the transfer function operator and the phase locked loop to an operator to provide a second control reference, determining a second difference between the second control reference and $I_{ac}$, providing the second difference to a second transfer function operator, providing the output of the second transfer function operator as a modulating signal to a comparator, and providing a carrier input to the comparator effective to output a command for the plurality of inverter switching device.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A power converter comprising:
    a first DC/DC converter structured to receive DC power at a varying first voltage and convert the received DC power to DC power with a second voltage;
    a second DC/DC converter electrically coupled in series with the first DC/DC converter, and structured to receive the converted DC power at the second voltage from the first DC/DC converter and boost the voltage of the received DC power to a third voltage, the second DC/DC converter including:
    a first DC bus having a first rail and a second rail,
    at least one pair of switching devices structured to operate at a resonant frequency greater than 10 kHz and coupled across the first DC bus, and
    at least one power cell including:
    a first input node,
    a second input node, and
    an output node coupled to the first input node by way of at least two diodes coupled in series, coupled to the first input node by way of an energy storage device coupled in parallel with two of the diodes, and coupled to the second input node by way of one of the two diodes and a resonant circuit;
    an inverter structured to receive DC power at the third voltage from the second DC converter and convert the received DC power to AC power output; and
    a control system structured to operate the first DC/DC converter using a first control input and to operate the inverter using a second control input, the first control input and the second control input comprising distinct input values.

2. The power converter of claim 1 wherein the control system comprises an inverter controller structured to measure the third voltage, the AC output voltage, and the AC output current; and operate the inverter using a pulse width modulation signal calculated using the measured third voltage, the AC output voltage, and the AC output current.

3. The power converter of claim 1 comprising a DC/DC controller structured to operate the first DC/DC converter so as to convert the received DC power at the first voltage to DC power at the second voltage by magnifying the amplitude of the first voltage so as to produce a substantially fixed second voltage greater in magnitude compared to the first voltage.

4. The power converter of claim 3 wherein the DC/DC controller is structured to measure the first voltage, measure the current of the DC power received by the first DC/DC converter, and operate the first DC/DC converter by transmitting a pulse width modulation signal calculated using the first voltage measurement and current measurements.

5. The power converter of claim 1 wherein the switching devices are wide band-gap semiconductor devices structured to operate at a switching frequency greater than 20 kHz.

6. The power converter of claim 1 wherein the energy storage device is a battery bank.

7. The power converter of claim 1 wherein the first input node of a first power cell is coupled to the first rail of the DC bus and the second input node of the same power cell is coupled to each of the pair of switching devices.

8. The power converter of claim 7 wherein the second DC/DC converter comprises a second power cell, and wherein the first input node of the second power cell is coupled to the energy storage device and one of the two diodes of the first power cell, and the second input node of the second power cell is coupled to each of the two diode of the first power cell.

9. The power converter of claim 1 wherein the resonant circuit of the second DC/DC converter is structured such that the pair of switching devices of the second DC/DC converter are activated or deactivated in substantially zero current conditions.

10. An electrical power conversion system comprising:
a first converter stage electrically coupled with a PV source, the first stage including a first switching device and being operable to boost DC power received from the PV source;
a second converter stage electrically coupled in series with the first converter stage, the second converter stage including second and third switching devices operably coupled with a resonant circuit network and being operable to boost DC power received from the first converter stage;
a third converter stage electrically coupled with the second converter stage and electrically coupled with an AC electrical power system, the third stage including an inverter bridge including a plurality of inverter switching devices; and
an electronic control system structured to
receive as input information of a voltage ($V_{pv}$) and a current ($I_{pv}$) that are output by the PV source to the first converter stage, information of a voltage ($V_{dc}$) output by the second controller stage to the third controller stage, and information of a voltage ($V_{ac}$) and a current ($I_{ac}$) which are output by the third stage to the AC electrical power system,
process the information of ($V_{pv}$) and ($I_{pv}$) to provide a control command for the first switching device,
process the information of ($V_{dc}$, $V_{ac}$) and ($I_{ac}$) to provide control commands for the plurality of inverter switches, and
provide control commands for the second and third switching devices utilizing a predetermined duty cycle effective to provide resonant frequency operation of the second and third switching devices.

11. The system of claim 10 wherein the resonant circuit network includes at least one power cell comprising a first input node, a second input node, and an output node coupled to the first input node by way of at least two diodes coupled in series, coupled to the first input node by way of an energy storage device coupled in parallel with two of the diodes, and coupled to the second input node by way of one of the two diodes and a resonant circuit.

12. The system of claim 11 wherein the resonant circuit network includes a plurality of said at least one power cell operatively coupled to one another.

13. The system of claim 10 wherein the electronic control system is structured to process the information of ($V_{pv}$) and ($I_{pv}$) using a DC/DC converter controller to provide a control command for the first switching device.

14. The system of claim 10 wherein the electronic control system is structured to provide a control command for the first switching device by:
receiving a first control reference from a maximum power point tracking controller,
determining a first difference between ($V_{pv}$) and the first control reference,
providing the first difference to a transfer function operator to provide a second control reference,
determining a second difference between ($I_{pv}$) and the second control reference,
providing the second difference as a modulating signal to a comparator, and
providing a carrier input to the comparator effective to output a command for the first switching device.

15. The system of claim 10 wherein the electronic control system is structured to process the information of ($V_{dc}$, $V_{ac}$) and ($I_{ac}$) to provide control commands for the plurality of inverter switching devices by:
receiving a first control reference,
low pass filtering ($V_{dc}$)
determining a first difference between the low pass filtered ($V_{dc}$) and the first control reference,
providing the first difference to a transfer function operator,
providing ($V_{ac}$) to a phase locked loop,
providing the output of the transfer function operator and the phase locked loop to an operator to provide a second control reference,
determining a second difference between the second control reference and ($I_{ac}$),
providing the second difference to a second transfer function operator,
providing the output of the second transfer function operator as a modulating signal to a comparator, and
providing a carrier input to the comparator effective to output a command for the plurality of inverter switching device.

16. The system of claim 10 wherein the second converter is structured such that second and third switching devices are activated or deactivated under substantially zero current crossing conditions.

17. A method for converting power from a DC power source, comprising:
operating, with an electronic control system, a first converter stage including a first switching device, a second converter stage electrically coupled in series with the first converter stage including second and third switching devices, and a third converter stage including an inverter bridge including a plurality of inverter switching devices;
receiving, with the electronic control system, input information of a voltage ($V_{pv}$) and a current ($I_{pv}$) that are output by the DC source to the first converter stage, information of a voltage ($V_{dc}$) output by the second controller stage to the third controller stage, and information of a voltage ($V_{ac}$) and a current ($I_{ac}$) which are output by the third stage to the AC electrical power system;
processing, with the electronic control system, the information of ($V_{pv}$) and ($I_{pv}$) to provide a control command for the first switching device so as to reduce fluctuation of ($V_{pv}$);

processing, with the electronic control system, the information of ($V_{dc}$, $V_{ac}$) and ($I_{ac}$) to provide control commands for the plurality of inverter switches; and providing, with the electronic control system, control commands for the second and third switching devices utilizing a predetermined duty cycle effective to operate the second and third switching devices at a resonant frequency.

18. The method of claim 17, wherein the control commands provided to the second and third switching devices are structured to operate the second and third switching devices under substantially zero current switching conditions.

19. The method of claim 18, wherein substantially zero current switching conditions includes a range between 0% and 10% of the peak magnitude of the current received by the second converter stage.

20. The method of claim 17 wherein processing, with the electronic control system, the information of ($V_{pv}$) and ($I_{pv}$) to provide a control command for the first switching device comprises:

receiving a first control reference from a maximum power point tracking controller, determining a first difference between ($V_{pv}$) and the first control reference, providing the first difference to a transfer function operator to provide a second control reference, determining a second difference between ($I_{pv}$) and the second control reference, providing the second difference as a modulating signal to a comparator, and providing a carrier input to the comparator effective to output a command for the first switching device.

21. The method of claim 17 wherein processing, with the electronic control system, the information of ($V_{dc}$, $V_{ac}$), and ($I_{ac}$) to provide control commands for the plurality of inverter switches comprises:

receiving a first control reference, filtering ($V_{dc}$), determining a first difference between the low pass filtered ($V_{dc}$) and the first control reference, providing the first difference to a transfer function operator, providing ($V_{ac}$) to a phase locked loop, providing the output of the transfer function operator and the phase locked loop to an operator to provide a second control reference, determining a second difference between the second control reference and ($I_{ac}$)

providing the second difference to a second transfer function operator, providing the output of the second transfer function operator as a modulating signal to a comparator, and providing a carrier input to the comparator effective to output a command for the plurality of inverter switching device.

* * * * *